US011850798B2

(12) United States Patent
Dicken et al.

(10) Patent No.: US 11,850,798 B2
(45) Date of Patent: Dec. 26, 2023

(54) DETERMINATION DEVICE FOR DETERMINING AT LEAST ONE PARAMETER OF AN ENERGY BEAM

(71) Applicant: CONCEPT LASER GMBH, Lichtenfels (DE)

(72) Inventors: Christian Dicken, Weidenberg (DE); Thomas Schulz, Gerach (DE)

(73) Assignee: Concept Laser GmbH, Lichtenfels (DE)

( * ) Notice: Subject to any disclaimer, the term of this patent is extended or adjusted under 35 U.S.C. 154(b) by 1124 days.

(21) Appl. No.: 16/294,848

(22) Filed: Mar. 6, 2019

(65) Prior Publication Data
US 2020/0130279 A1    Apr. 30, 2020

(30) Foreign Application Priority Data

Oct. 26, 2018  (EP) .................................. 18202970

(51) Int. Cl.
*B29C 64/386*   (2017.01)
*B33Y 30/00*    (2015.01)
(Continued)

(52) U.S. Cl.
CPC .......... *B29C 64/386* (2017.08); *B23K 26/032* (2013.01); *B23K 26/064* (2015.10);
(Continued)

(58) Field of Classification Search
CPC ..... B29C 64/386; B29C 64/268; B33Y 30/00; B33Y 50/00; B23K 26/064; B23K 26/705; B23K 26/032; B23K 26/067; B28B 1/001
See application file for complete search history.

(56) References Cited

U.S. PATENT DOCUMENTS 4,452,532 A     6/1984 Grollimund et al.
2006/0289412 A1* 12/2006 Hamada ............... B23K 26/067
                                                   219/121.75
(Continued)

FOREIGN PATENT DOCUMENTS

JP      H0780671 A      3/1995
JP      H09271971 A     10/1997
WO   WO2009066918 A2    5/2009

OTHER PUBLICATIONS

European Search Report Corresponding to EP18202970 dated Mar. 11, 2019.

(Continued)

*Primary Examiner* — Yung-Sheng M Tsui
(74) *Attorney, Agent, or Firm* — Dority & Manning, P.A.

(57) ABSTRACT

Determination device (2) for determining at least one parameter of an energy beam (4), in particular an energy beam (4) generated via an irradiation device of an apparatus (1) for additively manufacturing three-dimensional objects, which determination device (2) comprises two determination units (5, 6) arrangeable or arranged in succession in a beam path (3) of the energy beam (4), characterized in that each determination unit (5, 6) builds or comprises at least one complementary pattern element (15, 18, 21, 23, 24, 27, 30), wherein at least two pattern elements (15, 18, 21, 23, 24, 27, 30) of the two determination units (5, 6) complement each other to a superordinate pattern (32, 35).

17 Claims, 3 Drawing Sheets

(51) Int. Cl.
    *B33Y 50/00* (2015.01)
    *B23K 26/064* (2014.01)
    *B23K 26/342* (2014.01)
    *B23K 26/70* (2014.01)
    *B29C 64/268* (2017.01)
    *B23K 26/03* (2006.01)
    *B23K 26/067* (2006.01)
    *B28B 1/00* (2006.01)

(52) U.S. Cl.
    CPC .......... *B23K 26/067* (2013.01); *B23K 26/342* (2015.10); *B23K 26/705* (2015.10); *B28B 1/001* (2013.01); *B29C 64/268* (2017.08); *B33Y 30/00* (2014.12); *B33Y 50/00* (2014.12)

(56) References Cited

U.S. PATENT DOCUMENTS

2007/0000884 A1* 1/2007 Salama ................ B23K 26/066
                                                                         219/121.68
2007/0145025 A1* 6/2007 Yamazaki ............ B23K 26/043
                                                                         219/121.74
2018/0111318 A1 4/2018 Herzog et al.

OTHER PUBLICATIONS

Anonymous, Deuba Puzzlematte 86 tlg. Kalteschutz, XP055563393, Jan. 1, 2013 pp. 1-9. Retrieved from the Internet on Feb. 28, 2019: URL:https://www.amazon.de/Deuba-Kinderspielteppich-Spielteppich-Schaumstoffmatte-?phantasiefordernd/dp/B00C65UUW0/ref=sr_1_8?ie=UTF8&qid=1551364775&sr=8~8&keywords=puzzle+baby.

* cited by examiner

DETERMINATION DEVICE FOR DETERMINING AT LEAST ONE PARAMETER OF AN ENERGY BEAM

CROSS-REFERENCE TO RELATED APPLICATIONS

This application claims priority to European Patent Application serial no. 18 202 970.2 filed Oct. 26, 2018, the contents of which is incorporated herein by reference in its entirety as if set forth verbatim.

The invention relates to a determination device for determining at least one parameter of an energy beam, in particular an energy beam generated via an irradiation device of an apparatus for additively manufacturing three-dimensional objects, which determination device comprises two determination units arrangeable or arranged in succession in a beam path of the energy beam.

Determination devices for determining parameters of energy beams, for example parameters of laser beams, are generally known from prior art. Such determination devices are, inter alia, used in additive manufacturing apparatuses for the calibration of the additive manufacturing apparatuses, in particular irradiation devices of additive manufacturing apparatuses, to ensure that an energy beam used to selectively irradiate the build material is properly calibrated.

For example, it is known from prior art to use a determination device with two determination units that are arranged in succession in the beam path of the energy beam. As determination units wires are commonly used, e.g. tungsten wires, to determine whether the energy beam is properly calibrated or not. To determine whether the energy beam is properly aligned, two wires or wire crosses can be arranged in the beam path of the energy beam spaced apart from each other, wherein the resulting pattern, e.g. the shadow generated by illuminating the two wires with the energy beam, can be viewed on a screen by an operator. Hence, if the energy beam is properly aligned, the first wire will cover the second wire and therefore, only one line or cross is visible on the screen. However, if the energy beam is not properly aligned, e.g. incident on both wires under a defined angle relative to the optical axis, two wires or crosses are visible on the screen.

Disadvantageously, it is necessary to use comparatively thin wires to be able to properly identify misalignments of the energy beam, wherein comparatively thin wires tend to heat up quickly due to the irradiation with the energy beam and tend to deform or even melt and tear. Therefore, the success of the determination process strongly depends on the skill and the experience of the operator, as the determination process has to be performed comparatively fast before the fragile wires heat up leading to a deformation of the wires and therefore, cause an error in the determination process. Further, using wires does not properly allow for determining a deviation from a defined lateral position of the energy beam with respect to an optical axis, as the impact of the position of the wire on the intensity distribution of the energy beam is comparatively small.

Another disadvantage is, that the operator has to view the pattern generated via the energy beam on a screen, e.g. the operator views the shadow of the wire generated in the intensity distribution of the energy beam on the screen and therefore, use the direct uncovered energy beam on the screen. Thus, wearing protective glasses is usually mandatory to assure that the operator is protected from the energy beam, for example from direct contact with the laser beam. Thus, it is also necessary to take precautions in that the energy beam cannot exit the apparatus or the area in which the operator views the screen to ensure that other personnel does not come in contact with the energy beam. Usually, the apparatus that is currently calibrated is completely housed in a protective housing, e.g. via curtains and the like.

Therefore, determining the at least one parameter of the energy beam, e.g. using the at least one parameter of the energy beam to calibrate an irradiation device, is cumbersome and time-consuming, as the safety precautions have to be installed prior to determining the at least one parameter. Further, the safety precautions have to be taken for each operator and other personnel, for example regarding plants with a large number of apparatuses, each operator in at least a large part of the plant around the apparatus that has to be calibrated needs to be protected from the radiation, e.g. via protective glasses or a housing of the apparatus in calibration.

It is an object of the present invention to provide an improved determination device for determining at least one parameter of an energy beam, which determination device is in particular more insensitive to the irradiation with the energy beam and which determination device allows for performing the determination process with less safety precautions.

The object is inventively achieved by determination device according to claim 1. Advantageous embodiments of the invention are subject to the dependent claims.

The determination device described herein is a determination device for determining at least one parameter of an irradiation device of an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance. Further, the inventive determination device may be used for other types of apparatuses in which an irradiation device is adapted to generate (and guide) an energy beam, e.g. for marking laser machines.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to a determination device that comprises two determination units that can be arranged or are arranged in succession in the beam path of the energy beam. The invention is based on the idea that each determination unit builds or comprises at least one complementary pattern element, wherein at least two pattern elements of the two determination units complement each other to a superordinate pattern. Thus, each of the determination units is built as or comprises one or more complementary pattern elements, wherein at least two pattern elements of the two different determination units complement each other so as to form a superordinate pattern.

In other words, the two determination units that are arranged in the beam path of the energy beam generate a superordinate pattern, for example on a screen behind the determination units in the beam path. Thus, it is possible to determine at least one parameter of the energy beam dependent on the generation of the superordinate pattern. For example, if the superordinate pattern is properly generated or formed by illuminating the determination units with the energy beam, it can be derived that the energy beam is properly calibrated, whereas when the superordinate pattern is not properly generated, e.g. formed asymmetric or a deviation occurs from a nominal superordinate pattern, it is possible to derive that the energy beam is not properly calibrated and even possible to identify the error, e.g. a misalignment or a deviation from a nominal lateral position.

Preferably, the determination device is adapted to output the superordinate pattern, for example the superordinate pattern can be viewed on a screen by an operator, but it is also possible that the superordinate pattern may be captured, e.g. via camera and output on a display to be viewed by a user or an operator, for instance. It is also possible that the determination device is adapted to (automatically) determine at least one parameter of the energy beam, in particular relating to a calibration status of the energy beam, based on the superordinate pattern. Hence, it is possible to have the determination device being adapted to actively analyze the superordinate pattern and identify deviations from a nominal superordinate pattern and therefore, conclude on possible misalignments (lateral position, angle) of the energy beam.

The at least one complementary pattern element that each determination unit comprises further allows for a different approach compared to the determination devices described before, as it is not necessary to arrange identical parts of the pattern elements of the determination units in succession, e.g. pattern elements of identical shape arranged in the same position relative to the optical axis or relative to (a nominal position of) the energy beam. Hence, the superordinate pattern is composed of the images (shadows) of the individual pattern elements, wherein an uncalibrated energy beam would lead to a deviation from the superordinate pattern, for example, if two edges of two complementary pattern elements are not properly illuminated via the energy beam, a gap is visible in the superordinate pattern.

By following the approach of using complementary parts instead of identical parts it is also possible to use comparatively solid and massive determination units and pattern elements compared to approach is known from prior art, in particular compared to using comparatively thin wires. Thus, pattern elements and the complementary parts can be manufactured more solid increasing the insensitivity of the calibration units against thermal effects when irradiated with the energy beam. Therefore, the time the operator has to perform the determination process is significantly increased, as errors induced via heating the determination units are significantly reduced.

The term "identical part" of the determination unit or a pattern element refers in the scope of this application to parts that are arranged in succession in the beam path, wherein one identical part covers the other identical part, if the energy beam is properly calibrated. Hence, identical parts comprise an identical shape with respect to an optical axis, for instance. In other words, an identical part arranged in succession to the other identical part is arranged in the geometrical shadow of the first identical part, if the energy beam is properly calibrated. Hence, a not properly calibrated energy beam irradiating two identical parts being arranged in the beam path in succession generates the shadows of both identical parts in the image plane/on the screen. The term "complementary part" in the scope of this application refers to parts that are arranged in succession in the beam path that combine to a superordinate pattern, e.g. parts that are not identical. Hence, a second complementary part being arranged in succession to a first complementary part in the beam path is not arranged in the geometrical shadow of the first complementary part but generates "its own shadow" in the image plane. The term image plane may be any arbitrary plane in which the shadow of the determination units can be viewed, e.g. a screen, a detector element or any other determination plane.

According to an embodiment of the inventive determination device, the determination device may be adapted to generate calibration information relating to a calibration status of the energy beam, in particular relating to an alignment and/or an angle of the energy beam relative to an optical axis. Hence, as described before, the superordinate pattern can be viewed on a screen or can be output, e.g. to a display, wherein it is also possible to use at least one algorithm to determine a calibration information out of the superordinate pattern. The calibration information preferably relates to a calibration status of the energy beam, wherein in the simplest case the calibration information may relate to whether the energy beam is calibrated or not. The calibration information may further relate to the angle under which the energy beam is incident, e.g. relative to an optical axis. Further, the position of the center of the energy beam may be indicated via the calibration information, e.g. with respect to a reference axis such as an optical axis.

Hence, the determination device allows for generating information relating to whether the energy beam is properly calibrated or not. In particular, it is possible to determine absolute values of different parameters of the energy beam, such as the lateral position of the energy beam or the angle under which the energy beam is incident. Hence, if a deviation from a nominal alignment and/or angle occurs, it is possible to compensate the deviation and therefore, calibrate the energy beam or the irradiation device, respectively, based on the generated calibration information.

As described before, the determination units comprise pattern elements with at least one complementary part. According to a preferred embodiment of the inventive determination device, the determination unit may comprise pattern elements with at least one complementary part and at least one identical part. Hence, it is possible to combine the advantages of using at least one complementary part with the advantages that come together with the use of at least one identical part in each determination unit. For example, the use of identical parts, as described before, allows for a defined determination of the lateral position of the energy beam, wherein the at least one complementary part, inter alia, allows for deriving whether the energy beam is incident under a defined angle, e.g. parallel to a reference axis, preferably the optical axis.

It is particularly preferred that the determination device may be adapted to generate the superordinate pattern in an image plane, wherein the superordinate pattern comprises the images of the pattern elements of the determination units. In other words, the pattern elements of the determination units absorb the energy beam dependent on the shape of the pattern elements. Hence, the energy beam can only pass along the beam path dependent on the structure or the shape of the determination units. Thus, in the image plane a superordinate pattern can be generated that is composed of the shadows generated via the determination units. Based on that shadow/image of the determination units, it is possible to determine whether the energy beam is properly calibrated or not. The superordinate pattern that is generated in the image plane can, inter alia, be compared with a nominal superordinate pattern, wherein deviations between the actual superordinate pattern and the nominal superordinate pattern can be identified and compensated accordingly.

As described before, the determination device may comprise two determination units, wherein one of the determination units may be deemed as "first determination unit" and the other determination unit may be deemed as "second determination unit". Of course, it is not important which of the two determination units is deemed first and second determination unit and an arbitrary assignment of the term "first determination unit" and "second determination unit" is possible. The inventive determination device may be improved in that a, preferably annular, first determination unit comprises a first pattern element with a first inner diameter and a first outer diameter, wherein the first outer diameter of the first pattern element of the first determination unit corresponds to a first inner diameter of a first pattern element of a second determination unit.

Thus, the determination device comprises a first determination unit and a second determination unit, wherein both, the first determination unit and the second determination unit comprise a first pattern element, e.g. an inner pattern element. The first pattern element of the first determination unit comprises a first inner diameter and a first outer diameter, e.g. the first pattern element of the first determination unit may be built as annular disk comprising the first inner diameter and the first outer diameter. The first pattern element of the second determination unit, of course, also comprises a first inner diameter and a first outer diameter, wherein the first inner diameter of the first pattern element of the second determination unit corresponds to the first outer diameter of the first pattern element of the first determination unit. In other words the outer diameter of the first pattern element of the first determination unit and the inner diameter of the first pattern element of the second determination unit match in that the first pattern elements of the first determination unit and the second determination unit complement each other to a superordinate pattern.

In other words, with a properly calibrated energy beam, a shadow is generated in the image plane that is comprised of the first pattern elements of the first determination unit and the second determination unit. If an energy beam is used that is not properly calibrated, e.g. tilted with respect to the reference axis, in particular the optical axis, a light gap is generated in the superordinate pattern between the outer diameter of the first pattern element of the first determination unit and the inner diameter of the first pattern element of the second determination unit. Of course, the determination units do not have to be annular, but can comprise any arbitrary shape. In case, the determination units or the pattern elements are not of annual shape, it is also possible to use other geometrical values than the diameter, such as the width, the length, a diagonal or any other characteristic geometrical parameter of the corresponding pattern element.

Further, the first outer diameter of the first pattern element of the second determination unit may be smaller than a second inner diameter of a second pattern element of the first determination unit. Therefore, the superordinate pattern generated in the image plane will show a light gap between the first outer diameter of the first pattern element of the second determination unit and the second inner diameter of the second pattern element of the first determination unit. Thus, it is possible to identify whether the energy beam is calibrated, as with a calibrated energy beam only the light gap between the first outer diameter of the first pattern element of the second determination unit and the second inner diameter of the second pattern element of the first determination unit will be visible, whereas if an uncalibrated energy beam is used, other light gaps will be visible, such as a light gap between the first outer diameter of the first pattern element of the first determination unit and the first inner diameter of the first pattern element of the second determination unit. Hence, dependent on the superordinate pattern, it is possible to determine whether the energy beam is properly calibrated and it is possible to identify a misalignment of the energy beam.

The inventive determination device may further be improved in that each determination unit comprises at least one pattern element, preferably four pattern elements, extending in radial direction with respect to a reference axis, e.g. an optical axis, wherein the pattern elements comprise at least one complementary part. For example, it is possible to have four pattern elements extending in radial direction, e.g. forming a cross or parts of a cross in the image plane. The pattern elements comprise at least one complementary part, e.g. complementing each other to a geometrical shadow in the image plane. If a deviation from a calibration occurs, the shadow generated in the image plane will not be properly generated e.g. the superordinate pattern will not be properly generated and therefore, it is possible to generate the corresponding calibration information.

The determination device may comprise a determination means, e.g. comprising an optical sensor, such as a CCD or CMOS sensor, wherein the determination means is adapted to capture the superordinate pattern generated in the image plane and output it to a user or an operator, e.g. display the superordinate pattern on a display unit, e.g. a monitor. The determination means may further be adapted to determine an actual lateral position of the energy beam and/or an actual angle of the energy beam, wherein the determination means may in particular be adapted to compare the actual lateral position with the nominal position and/or to compare the actual angle with the nominal angle. Hence, it is not only possible to capture the superordinate pattern generated in the image plane, but it is also possible to determine the actual lateral position and the actual angle of the energy beam, e.g. via a corresponding algorithm applied on the captured superordinate pattern, e.g. taking the intensity distribution and/or the shape or structure of the superordinate pattern into calculation and deriving the corresponding parameters of the energy beam therefrom.

According to another preferred embodiment of the determination device, the determination device comprises a beam splitter and a screen, wherein the beam splitter is adapted to guide the energy beam that passed the two determination units to the screen, wherein the determination means is adapted to receive radiation emitted from the screen passing through the beam splitter. In other words, the beam splitter may be sensitive to the radiation of the energy beam, e.g. the reflectivity of the beam splitter may be sensitive to the wavelength of the radiation of the energy beam. For example, the vast ratio of radiation of the wavelength of the energy beam is reflected at the beam splitter, e.g. 99.8% of the energy beam, preferably infrared radiation, whereas radiation emitted from the screen, e.g. radiation in the green or orange part of the visual spectrum, can pass the beam splitter, e.g. to a vast ratio, such as 99%. Therefore, it is possible to guide the energy beam to the screen, wherein the superordinate pattern is generated on the screen leading to the generation of the superordinate pattern which can be captured via the determination means, e.g. a camera. Subsequently, the captured superordinate pattern can be output to a user or an operator, e.g. on a display unit. It is also possible that an image analysis can be performed on the superordinate pattern, e.g. involving algorithms as described before.

Further, it is possible to directly use a detector unit, such as a CCD chip instead of the screen, as described before. In this embodiment, the beam splitter is preferably adapted to guide a minor part, e.g. below 1%, preferably below 0.1% to the detector unit. Therefore, a screen is not necessary, but the superordinate pattern may directly be generated on the detector unit.

According to another embodiment, the determination unit may be adapted to determine the center of an intensity distribution imaged to the screen. For example, the determination of the center of the intensity distribution can be performed based on different values captured via the determination means, such as a pixelwise analysis of the intensity of the superordinate pattern in that the center of the intensity distribution and therefore, the lateral position of the energy beam relative to a reference axis, in particular an optical axis, can be determined.

The determination device may further be adapted to determine deviations from a symmetry of at least one superordinate pattern and/or adapted to compare the determined superordinate pattern with a nominal superordinate pattern, in particular differences may be identified. Hence, the shape or the structure of the superordinate pattern that is determined or captured via the determination means, for instance, can be compared with a nominal superordinate pattern that would be achieved with a properly calibrated energy beam illuminating the determination units. For example, it is possible to compare the determined superordinate pattern and the nominal superordinate pattern and identify additional or missing lines or additional or missing light gaps, and to compare both superordinate patterns with respect to the symmetry or identify different regions in the superordinate patterns comprising different brightness. It is also possible to analyze the symmetry of the superordinate pattern, wherein, for example, differences in the brightness of different parts of the superordinate pattern may be identified and thereby, a misalignment of the energy beam can be determined.

Further, it is possible to fit different functions or algorithms to the determined superordinate pattern, in particular periodic functions, such as sine and cosine based functions to enhance or suppress different signals that can be received in different calibration states of the energy beam. For example, it is particularly possible to have multiple slits that can be viewed in the image plane with a properly calibrated energy beam and light gaps or slits that can only be visible with an energy beam incident under an angle with respect to the optical axis.

According to another preferred embodiment of the invention, the determination device may be mountable in a position of a specific optical component or element in the beam path, in particular mountable to at least one receiving unit of the apparatus. Hence, for performing the determination process or a calibration process in which the determination device is used, the determination device may be mounted in a position of an optical element that is arranged in that specific position in a regular mode of operation. Thus, it is further ensured that the at least one parameter of the energy beam, e.g. the calibration status of the energy beam, can be determined in a well-defined position in the optical path or the beam path of the energy beam. For example, it is possible to arrange the determination device in advance to a scanner or a beam guiding unit, respectively, which is used to guide the energy beam across the build plane in a regular mode of operation. As it is necessary to provide a well calibrated energy beam to such a beam guiding unit, the determination device can be mounted in a position right in advance to the beam guiding unit and the at least one parameter of the energy beam can be determined in that position.

The inventive determination device may further be improved by providing a moving unit which is adapted to move the determination device between the determination position and a park position. Hence, it is possible to keep the determination device inside the apparatus, wherein the determination device is arranged in a park position during a regular mode of operation, e.g. while performing an additive manufacturing process with the apparatus. If the at least one parameter of the energy beam, in particular the calibration status of the energy beam, has to be determined, the moving unit may move the determination device from the park position to the determination position in which the determination device is adapted to receive the energy beam, as described before. After the determination process is finished, the moving unit may move the determination device back from the determination position into the park position. Of course, it is also possible that the moving unit will move an optical element that is to be arranged in that specific position during a regular mode of operation in which the determination device is to be arranged during the determination process, i.e. the determination position, out of the determination position and place that optical element back into the determination position when the determination position is moved into the park position.

Besides, the invention relates to an apparatus for additively manufacturing three-dimensional objects by means of successive layerwise selective irradiation and consolidation of layers of a build material which can be consolidated by means of an energy source, which apparatus comprises an irradiation device adapted to generate at least one energy beam and a determination device, in particular an inventive determination device, as described before, that comprises two determination units arrangeable or arranged in succession in a beam path of the energy beam, wherein each determination unit comprises at least one complementary pattern element, wherein at least two pattern elements of the two determination units complement each other so as to form a superordinate pattern.

Further, the invention relates to a method for determining at least one parameter of an energy beam, in particular an energy beam generated via an irradiation device of an apparatus for additively manufacturing three-dimensional objects by means of successive layerwise selective irradiation and consolidation of layers of a build material which can be consolidated by means of an energy source, preferably an inventive apparatus, as described before, which apparatus comprises an irradiation device adapted to generate at least one energy beam and a determination device, preferably an inventive determination device, that comprises two determination units, wherein the two determination units are arranged in a beam path of the energy beam and a superordinate pattern is generated in an image plane, wherein each determination unit comprises at least one complementary pattern element, wherein at least two pattern elements of the two determination units complement each other so as to form a superordinate pattern.

Self-evidently, all details, features and advantages described with respect to the inventive determination device are fully transferable to the inventive apparatus and the inventive method.

Exemplary embodiments of the invention are described with reference to the Fig. The Fig. are schematic diagrams, wherein FIG. 1 shows an inventive apparatus with an inventive determination device;

Figure 1:
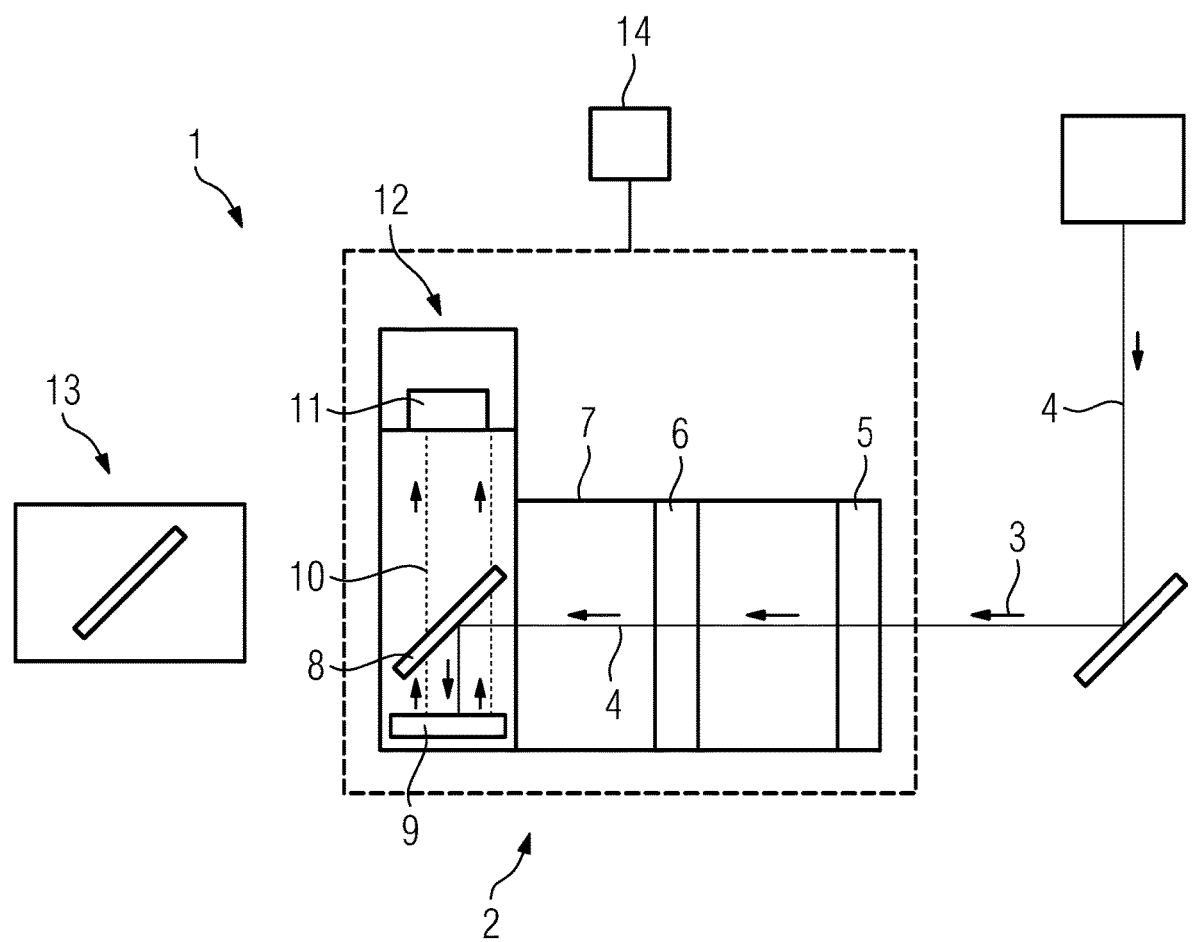

FIG. 1 shows an apparatus 1 for additively manufacturing three-dimensional objects (not shown). In the situation that is depicted in FIG. 1, a determination device 2 is arranged in a beam path 3 of an energy beam 4. The determination device 2 is used to determine at least one parameter of the energy beam 4, in particular relating to a calibration status of the energy beam 4. The determination device 2 comprises two determination units 5, 6, wherein the determination unit 5 may be deemed as "first determination unit" and the determination unit 6 may be deemed as "second determination unit" or vice versa.

The determination device 2 comprises a housing 7 in which both determination units 5, 6 are arranged. Further, the determination device 2 comprises a beam splitter 8 that is adapted to guide the energy beam 4 to a screen 9. The screen 9 generates radiation 10, e.g. UV radiation upon irradiation with the energy beam 4. The radiation 10 that is emitted by the screen 9 can pass the beam splitter 8 and therefore, is incident on a determination element 11 of a determination means 12. The determination means 12 may, inter alia, be built as or comprise a camera, such as a CCD or CMOS camera. Thus, the determination element 11 may be built as or comprise an optical sensor, such as a CCD or CMOS sensor.

In other words, the energy beam 4 may be guided to the determination device 2 where it passes the determination units 5, 6 and is reflected at the beam splitter 8 and is incident on the screen 9. Dependent on the shape and the structure of the determination units 5, 6 absorbing or reflecting the energy beam 4, a superordinate pattern is generated on the screen 9. Dependent on the superordinate pattern radiation 10 is emitted and received via the determination means 12. In other words, the determination means 12 is adapted to capture an image of the superordinate pattern generated in the image plane on the screen 9, as will be described below.

As can further be derived from FIG. 1, the determination device 2 is arranged in a defined mounting position in which an optical element is usually arranged in a regular mode of operation. The determination device 2 is arranged in advance to a beam guiding unit 13 which is adapted to guide the energy beam 4 across a build plane in a regular mode of operation of the apparatus 1. The determination device 2 further comprises a moving unit 14 that is adapted to move the determination device 2 to the determination position that is depicted in FIG. 1 and out of the determination position depicted in FIG. 1 into a park position (not shown) in which the determination device 2 is not arranged in the beam path 3 of the energy beam 4. With the determination device 2 in the park position, the energy beam 4 can be guided to the beam guiding unit 13 and therefore, can be guided across the build plane to selectively irradiate build material arranged in the build plane (not shown).

Figure 2:
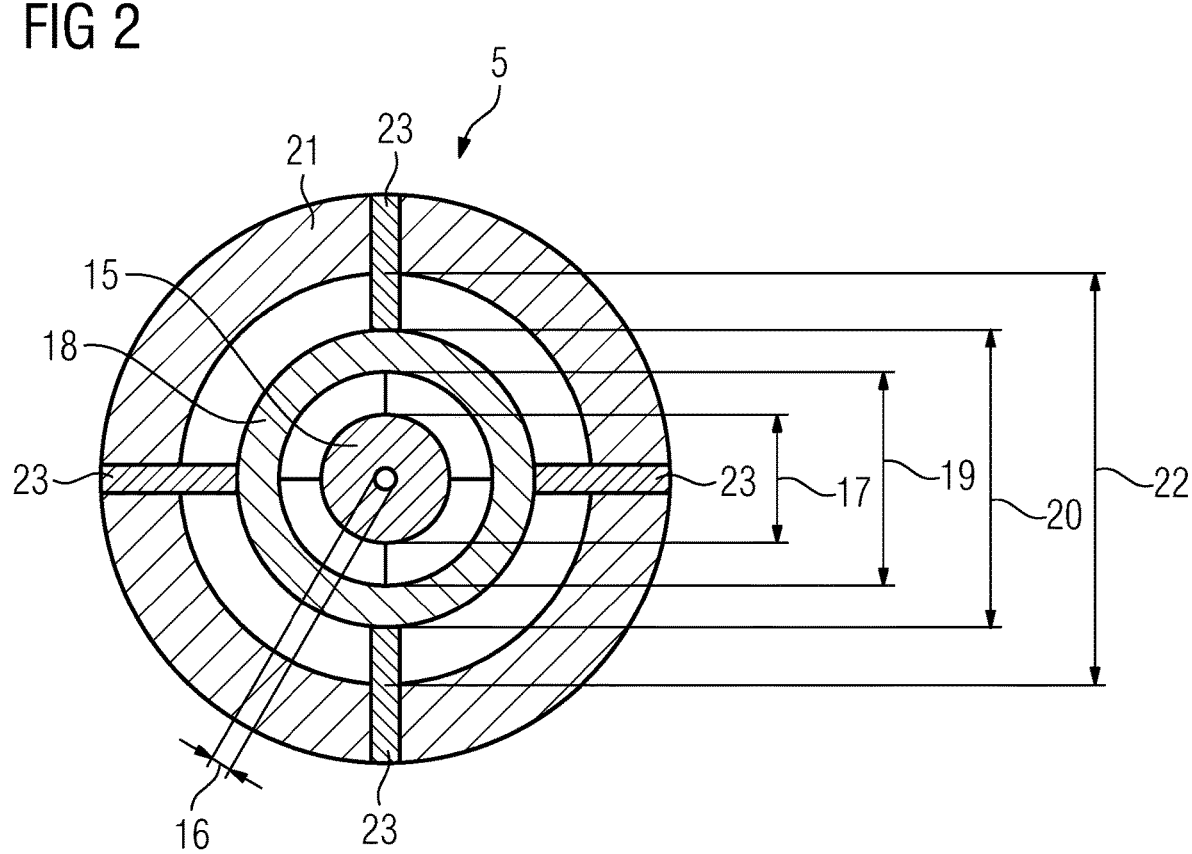
FIG. 2 shows a first determination unit of the inventive determination device of FIG. 1.
Figure 3:
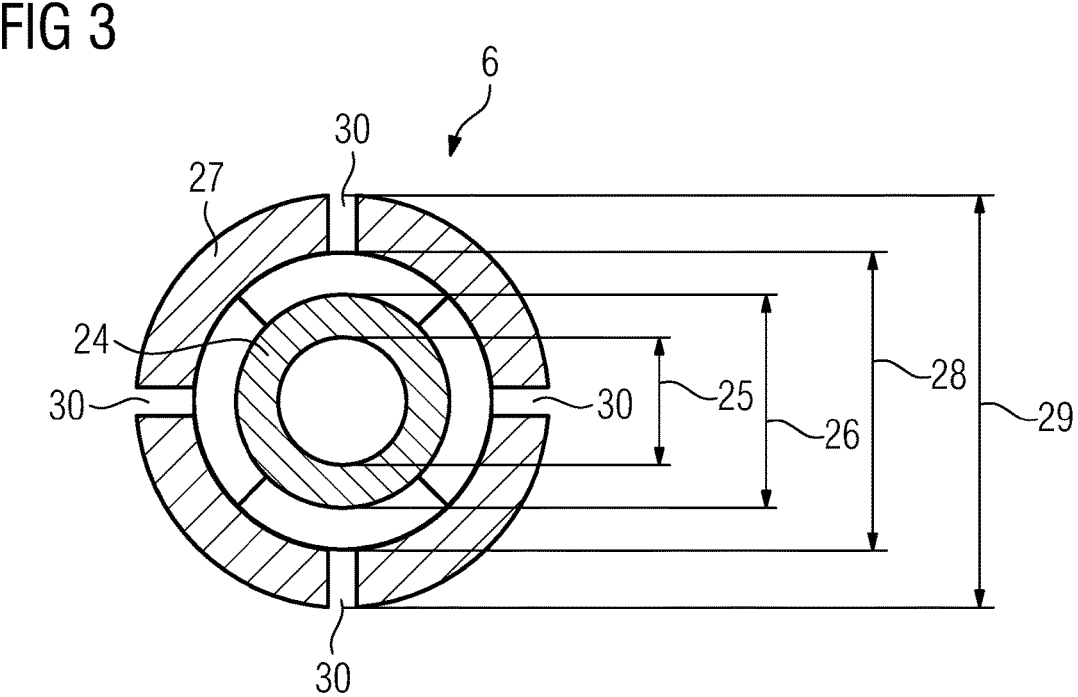
FIG. 3 shows a second determination unit of the inventive determination device of FIG. 1.
Figure 4:
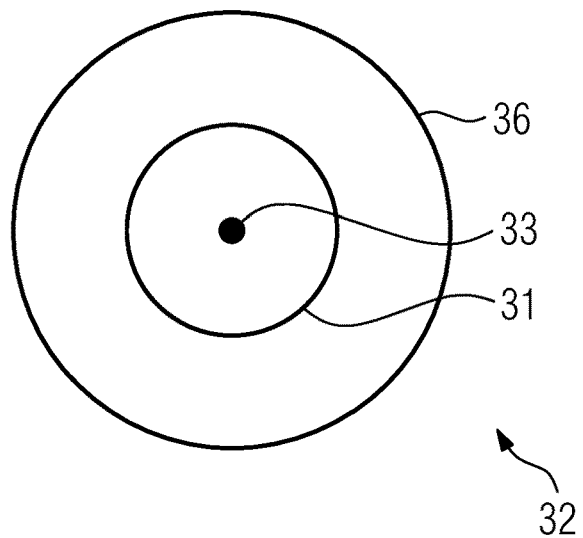
FIG. 4 shows a superordinate pattern in an image plane generated with a calibrated energy beam.

An exemplary embodiment of the first or second determination unit 5, 6 is depicted in FIG. 2, 3. In this exemplary embodiment the first determination unit 5 is depicted in FIG. 2 and the second determination unit 6 is depicted in FIG. 3, wherein it is also possible that the determination unit 6 depicted in FIG. 3 is used as first determination unit and the determination unit 5 depicted in FIG. 2 is used as second determination unit. Further, the shape of the determination units 5, 6 depicted in FIG. 2, 3 is merely exemplary and any other arbitrary shape of the determination units 5, 6 can also be used as long as the two or more determination units 5, 6 comprise pattern elements that complement each other to a superordinate pattern (FIG. 4).

With respect to FIGS. 2 and 3 it can be derived that the determination unit 5 generally comprises an annular shape, wherein the first determination unit 5 comprises a first pattern element 15 with a first inner diameter 16 and a first outer diameter 17. Further, the first determination unit 5 comprises a second pattern element 18 with a second inner diameter 19 and a second outer diameter 20. The determination unit 5 further comprises a third pattern element 21 with a third inner diameter 22. Additionally, the first determination unit 5 comprises four radially arranged pattern elements 23.

The second determination unit 6 also comprises a first pattern element 24 with a first inner diameter 25 and a first outer diameter 26. The second determination unit 6 further comprises a second pattern element 27 with a second inner diameter 28 and a second outer diameter 29. Additionally, the second determination unit 6 comprises four radially arranged pattern elements 30. As described before, the determination unit 5 and the determination unit 6 comprise complementary parts to form a superordinate pattern, as will be described in detail below with respect to FIG. 4, 5. As can be derived from FIGS. 2 and 3, the first outer diameter 17 of the first pattern element 15 of the first determination unit 5 is slightly smaller than the first inner diameter 25 of the first pattern element 24 of the second determination unit 6. Thus, a light gap 31 is generated in the superordinate pattern 32, as can be derived from FIG. 4. Further, as the first pattern element 15 of the first determination unit 5 comprises a first inner diameter 16 that is not covered by any pattern element of the second determination unit 6, a spot 33 is generated in the superordinate pattern 32.

Figure 5:
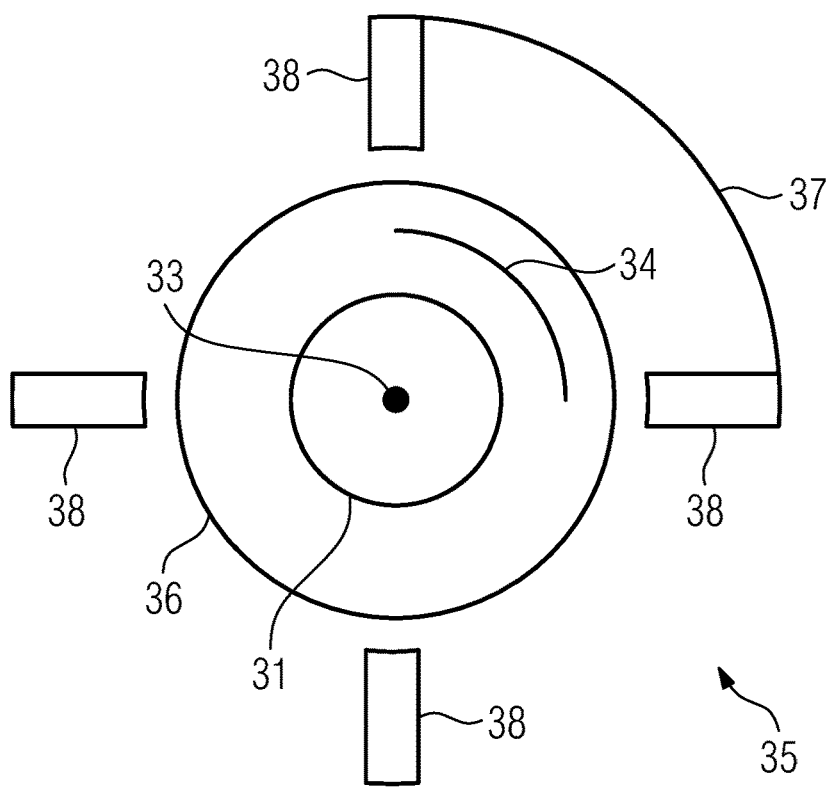
FIG. 5 shows a superordinate pattern in an image plane generated with an uncalibrated energy beam.

Further, the first outer diameter 26 of the first pattern element 24 of the second determination unit 6 matches the second inner diameter 19 of the second pattern element 18 of the first determination unit 5. Hence, if a properly calibrated energy beam 4 illuminates the determination units 5, 6, the superordinate pattern does not comprise an additional light gap in the corresponding position (first outer diameter 26, second inner diameter 19), as shown in the superordinate pattern 32. If, however an uncalibrated energy beam 4 is used, a light gap 34 is generated in the superordinate pattern 35, as depicted in FIG. 5. Hence, as the uncalibrated energy beam 4 is not properly aligned and therefore, is incident under an angle on the determination units 5, 6, the light gap 34 is formed and therefore, from the superordinate pattern 35 it can be derived that the calibration of the energy beam 4 or the irradiation device that generated the energy beam 4 is necessary.

Further, another light gap 36 is visible in the superordinate pattern 32 and 35, that results from the second outer diameter 20 of the second pattern element 18 which is slightly smaller than the second inner diameter 28 of the second pattern element 27 of the second determination unit 6. Since the third inner diameter 22 of the third pattern element 21 of the first determination unit 5 matches the second outer diameter 29 of the second pattern element 27, with a properly calibrated energy beam 4, no additional light gap is visible. As can be derived from FIG. 5, which shows a superordinate pattern 35 resulting from an uncalibrated energy beam 4, an additional light gap 37 is visible in the superordinate pattern 35. It is also possible that, e.g. dependent on the difference between the second outer diameter 20 if the second pattern element 18 and the second inner diameter 28 of the second pattern element 27, the light gap 36 is partially closed or reduced when an uncalibrated energy beam 4 is incident on the determination units 5, 6, e.g. the circular light gap 36 may be transformed to a semicircle.

Further, the radial pattern elements 23, 30 match in that they complement each other to a superordinate pattern in which no additional light gap is visible. As the superordinate pattern 35 is generated due to irradiation of the determination units 5, 6 with an uncalibrated energy beam 4, additional light gaps 38 are visible in the superordinate pattern 35. Hence, it is possible by comparing the superordinate patterns 32, 35, in particular in terms of symmetry, additional lines, intensity and the like, to derive whether the energy beam 4 is calibrated or not. For example, in the case that is depicted in FIG. 4, the superordinate pattern 32 matches the nominal superordinate pattern in that it can be derived that the energy beam 4 is properly calibrated. The superordinate pattern 35 that is depicted in FIG. 5 deviates from a nominal superordinate pattern in that it can be derived that the energy beam 4 is not properly calibrated and due to the asymmetry of the superordinate pattern, in particular due to the light gaps 34, 37 and 38, it can be derived that the energy beam 4 is tilted with respect to a reference axis, such as an optical axis. It is also possible that radial pattern elements are provided which generate light gaps in the corresponding superordinate pattern upon illumination with a calibrated energy beam 4. In this case it is advantageously possible that by determining differences in the intensity of the generated light gaps a lateral misalignment of the energy beam 4 can be identified.

As described before, it is possible that the superordinate patterns 32, 35 may be output to be viewed by a user or an operator of the apparatus 1. For example, the determination means 12 may capture an image of the superordinate patterns 32, 35 from the screen 9. Additionally or alternatively, it is possible that the determination means 12 uses at least one algorithm, in particular image analysis algorithm, to determine the center of the superordinate pattern 32, 35 and thereby determine the lateral position of the energy beam 4 under which it is incident on the determination units 5, 6 and the angle under which the energy beam 4 is incident on the determination units 5, 6, e.g. with respect to a reference axis, preferably an optical axis (not shown).

Of course, the inventive method may be performed on the inventive apparatus 1, preferably using an inventive determination device 2.

The invention claimed is:

1. A determination device arranged in a beam path of an energy beam generated via an irradiation device of an apparatus for additively manufacturing three-dimensional objects, the determination device comprising:
a first determination unit comprising one or more first pattern elements;
a second determination unit comprising one or more second pattern elements;
a beam splitter and a screen, the beam splitter disposed between the first and second determination units and the screen such that the energy beam is guided from the first and the second determination units to the beam splitter and then to the screen, the screen configured to emit radiation upon receiving irradiation of the energy beam from the beam splitter;
a camera comprising an optical sensor configured to receive the radiation emitted from the screen, wherein the optical sensor is configured to generate a pattern corresponding to a portion of the energy beam passing through each the first determination unit, the second determination unit, the screen, and the beam splitter by a presence or absence of one or more light gaps in the pattern, indicating an alignment or a misalignment of the energy beam;
wherein the first and the second determination units are arranged in succession in a beam path of the energy beam generated by the irradiation device, and wherein at least one of the one or more first pattern elements and at least one of the one or more second pattern elements are arranged together with respect to each other to form the pattern.

2. The determination device according to claim 1, wherein the determination device is configured to generate calibration information relating to a calibration status of the energy beam relating to the alignment and an angle of the energy beam relative to a reference axis.

3. The determination device according to claim 1, wherein at least one of each the one or more first pattern elements and the one or more second pattern elements respectively comprises at least one complementary part and at least one identical part with each other.

4. The determination device according to claim 1, wherein the first and the second determination units are configured to generate the pattern in an image plane, wherein the pattern comprises images of the one or more first pattern elements and the one or more first pattern elements of the first and the second determination units.

5. The determination device according to claim 1, wherein the one or more first pattern elements comprises an annular shape comprising a first inner diameter and a first outer diameter, the one or more second pattern elements comprises an annular shape comprising a second inner diameter and a second outer diameter wherein the first outer diameter corresponds to the second inner diameter.

6. The determination device according to claim 5, wherein the one or more first pattern elements comprises an additional pattern element, the additional pattern element comprising an annular shape comprising an inner diameter that is smaller than the second outer diameter of the one or more second pattern elements.

7. The determination device according to claim 1, wherein the one or more first pattern elements comprises one or more first radial pattern elements extending in a radial direction with respect to a reference axis, and the one or more second pattern elements comprises one or more second radial pattern elements extending in a radial direction with respect to a reference axis.

8. The determination device according to claim 1, further comprising a determination means configured to determine an actual lateral position of the energy beam and an actual angle of the energy beam, to compare the actual lateral position with a nominal position and to compare the actual angle with a nominal angle.

9. The determination device according to claim 1, wherein the camera is configured to determine a center of an intensity distribution imaged to the screen.

10. The determination device according to claim 1, wherein the radiation emitted from the screen is incident on the optical sensor.

11. The determination device according to claim 1, wherein the determination device is configured to determine a deviation from a symmetry of the pattern and is configured to compare a determined pattern with a nominal pattern.

12. The determination device according to claim 1, wherein the determination device is mountable in the beam path.

13. The determination device according to claim 1, wherein the determination device is mountable in the beam path in advance of a beam guiding unit.

14. The determination device according to claim 1, wherein a moving unit is configured to move the determination device between a determination position and a park position.

15. The determination device according to claim 14, wherein when the determination device is in the park position, the energy beam is guided to a beam guiding unit.

16. The determination device according to claim 14, wherein when the determination device is in the determination position, the determination device is in the beam path.

17. The determination device according to claim 1, wherein the energy beam comprises a laser beam or an electron beam.

* * * * *